(12) United States Patent
Mahoutian

(10) Patent No.: US 11,358,903 B2
(45) Date of Patent: Jun. 14, 2022

(54) CARBONATION CURING METHOD TO PRODUCE WET-CAST SLAG-BASED CONCRETE PRODUCTS

(71) Applicant: CARBICRETE INC., Montreal (CA)

(72) Inventor: Mehrdad Mahoutian, Montreal (CA)

(73) Assignee: CARBICRETE INC, Montreal (CA)

( * ) Notice: Subject to any disclaimer, the term of this patent is extended or adjusted under 35 U.S.C. 154(b) by 0 days.

(21) Appl. No.: 17/202,444

(22) Filed: Mar. 16, 2021

(65) Prior Publication Data

US 2021/0198147 A1 Jul. 1, 2021

Related U.S. Application Data

(63) Continuation of application No. PCT/CA2020/050467, filed on Apr. 9, 2020.

(60) Provisional application No. 62/832,966, filed on Apr. 12, 2019.

(51) Int. Cl.
| | | |
|---|---|---|
| *C04B 28/08* | (2006.01) | |
| *B28B 1/14* | (2006.01) | |
| *B28B 11/24* | (2006.01) | |
| *B28B 13/06* | (2006.01) | |
| *C04B 40/02* | (2006.01) | |

(52) U.S. Cl.
CPC ............. *C04B 28/085* (2013.01); *B28B 1/14* (2013.01); *B28B 11/245* (2013.01); *B28B 13/06* (2013.01); *C04B 40/0231* (2013.01); *C04B 40/0259* (2013.01); *C04B 40/0263* (2013.01)

(58) Field of Classification Search
CPC . C04B 28/085; C04B 40/024; C04B 40/0231; C04B 28/08; B28B 1/14; B28B 11/242; B28B 11/245; B28B 1/16; B28B 1/26; B22F 2007/047

USPC ......................................................... 264/29.1
See application file for complete search history.

(56) References Cited

U.S. PATENT DOCUMENTS

| | | | |
|---|---|---|---|
| 2,969,575 | A | 1/1961 | Gagne |
| 4,362,679 | A | 12/1982 | Malinowski |
| 4,588,443 | A * | 5/1986 | Bache ................... C04B 18/146 106/644 |
| 4,588,543 | A | 5/1986 | Shimizu |
| 5,021,205 | A | 6/1991 | Niioka |
| 5,250,113 | A | 10/1993 | Berke |
| 5,366,549 | A | 11/1994 | Imaizumi |

(Continued)

FOREIGN PATENT DOCUMENTS

| | | |
|---|---|---|
| CA | 2942401 A1 | 9/2015 |
| CA | 3038515 A1 | 3/2018 |

(Continued)

OTHER PUBLICATIONS

Machine English translation of JP-02137782-A; Kou, Sekio; (1990) (Year: 1990).*

(Continued)

*Primary Examiner* — Francisco W Tschen
*Assistant Examiner* — Edgaredmanuel Troche
(74) *Attorney, Agent, or Firm* — Cantor Colburn LLP

(57) ABSTRACT

The present description relates to methods of producing a wet-cast slag-based concrete product particularly where the wet-cast slag-based concrete product is cast, pre-conditioned and cured with carbon dioxide inside a mould and/or inside a mould placed in a curing chamber. The wet-cast slag-based concrete product is optionally reinforced.

21 Claims, 8 Drawing Sheets

(56) References Cited

U.S. PATENT DOCUMENTS

| | | |
|---|---|---|
| 8,845,594 B2 | 9/2014 | Jennings |
| 10,112,871 B2 | 10/2018 | Shao |
| 10,338,053 B2 | 7/2019 | Atakan |
| 10,350,787 B2 | 7/2019 | Forgeron |
| 10,570,064 B2 | 2/2020 | Monkman |
| 2013/0343734 A1 | 12/2013 | Dock |
| 2014/0197563 A1* | 7/2014 | Niven ............... B28B 1/08 264/69 |
| 2014/0322083 A1 | 10/2014 | Kuppler |
| 2015/0141552 A1* | 5/2015 | Takizawa ......... B28B 23/0006 524/4 |
| 2017/0036372 A1* | 2/2017 | Sandberg ............... B28B 1/26 |
| 2017/0073270 A1* | 3/2017 | Shao ............... B28B 11/245 |
| 2017/0102373 A1* | 4/2017 | Atakan ............... C04B 28/04 |
| 2017/0241871 A1 | 8/2017 | Mayelle |
| 2018/0230057 A1 | 8/2018 | Guynn |
| 2018/0258000 A1 | 9/2018 | Lee |
| 2019/0047175 A1 | 2/2019 | Hargest |
| 2019/0077045 A1 | 3/2019 | Monkman |
| 2019/0168416 A1 | 6/2019 | Monkman |
| 2019/0241473 A1 | 8/2019 | Goerger |
| 2020/0102713 A1* | 4/2020 | Huang ............... E02D 5/36 |
| 2020/0181032 A1 | 6/2020 | Michud |
| 2020/0299203 A1 | 9/2020 | Sant |
| 2020/0369567 A1* | 11/2020 | Okawa ............... C04B 18/24 |
| 2021/0107834 A1 | 4/2021 | Seth |

FOREIGN PATENT DOCUMENTS

| | | | |
|---|---|---|---|
| CN | 101774790 A | 7/2010 | |
| JP | 02137782 A * | 5/1990 | ............ C04B 40/024 |
| JP | 2000281467 A | 10/2000 | |
| JP | 2005053078 A | 3/2005 | |
| WO | 2004074733 A1 | 9/2004 | |
| WO | 2017000075 A1 | 1/2017 | |
| WO | 2017041176 A1 | 3/2017 | |
| WO | 2017041188 A1 | 3/2017 | |
| WO | 2017075126 A1 | 5/2017 | |
| WO | 2017127454 A1 | 7/2017 | |
| WO | 2017152120 A1 | 9/2017 | |
| WO | 2017155899 A1 | 9/2017 | |
| WO | 2017177324 A1 | 10/2017 | |
| WO | 2017192938 A1 | 11/2017 | |
| WO | 2017210294 A1 | 12/2017 | |
| WO | 2018058139 A1 | 3/2018 | |
| WO | 2018175748 A1 | 9/2018 | |
| WO | 2018175769 A1 | 9/2018 | |
| WO | 2018232507 A1 | 12/2018 | |
| WO | 2019060992 A1 | 4/2019 | |
| WO | 2019101809 A1 | 5/2019 | |
| WO | 2019101810 A1 | 5/2019 | |
| WO | 2019101811 A1 | 5/2019 | |
| WO | 2019112555 A1 | 6/2019 | |
| WO | 2019165275 A1 | 8/2019 | |
| WO | 2019165281 A1 | 8/2019 | |
| WO | 2020046927 A1 | 3/2020 | |
| WO | 2020124054 A1 | 6/2020 | |
| WO | 2020217232 A1 | 10/2020 | |
| WO | 2021071980 A1 | 4/2021 | |

OTHER PUBLICATIONS

Harsh Gupta et al., Strength Properties of Steel Slag in Concrete, Nov. 2017, International Journal of Engineering Research & Technology (IJERT), vol. 6 Issue 11 (Year: 2017).*

Akers, S. A. ., & Studinka, J . . . (1989). Ageing behaviour of cellulose fibre cement composites in natural weathering and accelerated tests. International Journal of Cement Composites and Lightweight Concrete, 11(2), 93-97. https://doi.org/10.1016/0262-5075(89) 90119-X (Year: 1989).*

International Search Report for corresponding application PCT/CA2020/050467 filed Apr. 9, 2020; Report dated Jun. 22, 2020.

International Search Report PCT/CA2020/050466 filed Apr. 9, 2020; dated Jun. 10, 2020.

Written Opinion of the International Searching Authority for corresponding application PCT/CA2020/050467 filed Apr. 9, 2020; Report dated Jun. 22, 2020.

Written Opinion of the International Searching Authority for PCT/CA2020/050466 filed Apr. 9, 2020; dated Jun. 10, 2020.

ACI Committee. (2008). 201.2R-08: Guide to Durable Concrete Durability. Michigan, US: American Concrete Institute.

ASTM C418. Standard Test Method for Abrasion Resistance of Concrete by Sandblasting.

ASTM C494-99a (Standard Specification for Chemical Admixtures for Concrete, ASTM International, West Conshohocken, PA, 2019).

ASTM. (2018a). Standard Specification for Solid Concrete Interlocking Paving Units (vol. ASTM C936-20, ASTM C936-16). West Conshohocken, PA: ASTM International.

ASTM. (2018b). Standard Test Method for Evaluating the Freeze-Thaw Durability of Dry-Cast Segmental Retaining Wall Units and Related Concrete Units (vol. ASTM C1262-18). West Conshohocken, PA: ASTM International.

ASTM. (2018c). Standard Test Methods for Sampling and Testing Concrete Masonry Units and Related Units (vol. ASTM C140-20). West Conshohocken, PA: ASTM International.

ASTM. (2019a). Standard Test Method for Abrasion Resistance of Concrete or Mortar Surfaces by the Rotating-Cutter Method (vol. ASTM C944-99). West Conshohocken, PA: ASTM International.

ASTM. (2019b). Standard Test Method for Freeze-thaw and De-icing Salt Durability of Solid Concrete Interlocking Paving Units (vol. ASTM C1645-15). West Conshohocken, PA: ASTM International.

ASTM. Standard Specification for Dry-Cast Segmental Retaining Wall Units (vol. ASTMC1372-04 & ASTM C1372-11). West Conshohocken, PA: ASTM International.

CSA A231.2-14 Precast concrete pavers. 2014.

Environmental Protection Agency. (1995). AP 42—Compilation of Air Pollutant Emission Factors, 5th Edition, vol. 1; Appendix A, B1 and B2 Research Triangle Park, NC. U. S. Environmental Protection Agency.

International Search Report for corresponding application PCT/CA2020/051702 filed Dec. 10, 2020; dated Mar. 16, 2021.

International Search Report for corresponding application PCT/CA2021/050533 filed Apr. 20, 2021; dated Jul. 14, 2021.

Patel, H., Bland, C.H., and Poole, A.B. "The Microstructure of Concrete Cured at Elevated Temperatures". Cement and Concrete Research, 25(3). (1995). pp. 485-490.

Shao Yixin, Morsher Abu (2013)—Early carbonation for hollow-core concrete slab curing and carbon dioxide recycling. Materials and Structures (2015) 48:307-319.

Written Opinion for corresponding application PCT/CA2020/051702 filed Dec. 10, 2020; dated Mar. 16, 2021.

Written Opinion of the International Searching Authority for corresponding application PCT/CA2021/050533 filed Apr. 20, 2021; dated Jul. 14, 2021.

Zhang, D., Ghouleh, Z. and Shao, Y. , "Review on carbonation curing of cement-based materials". Journal of CO2 Utilization, 21, (2017). pp. 119-131.

* cited by examiner

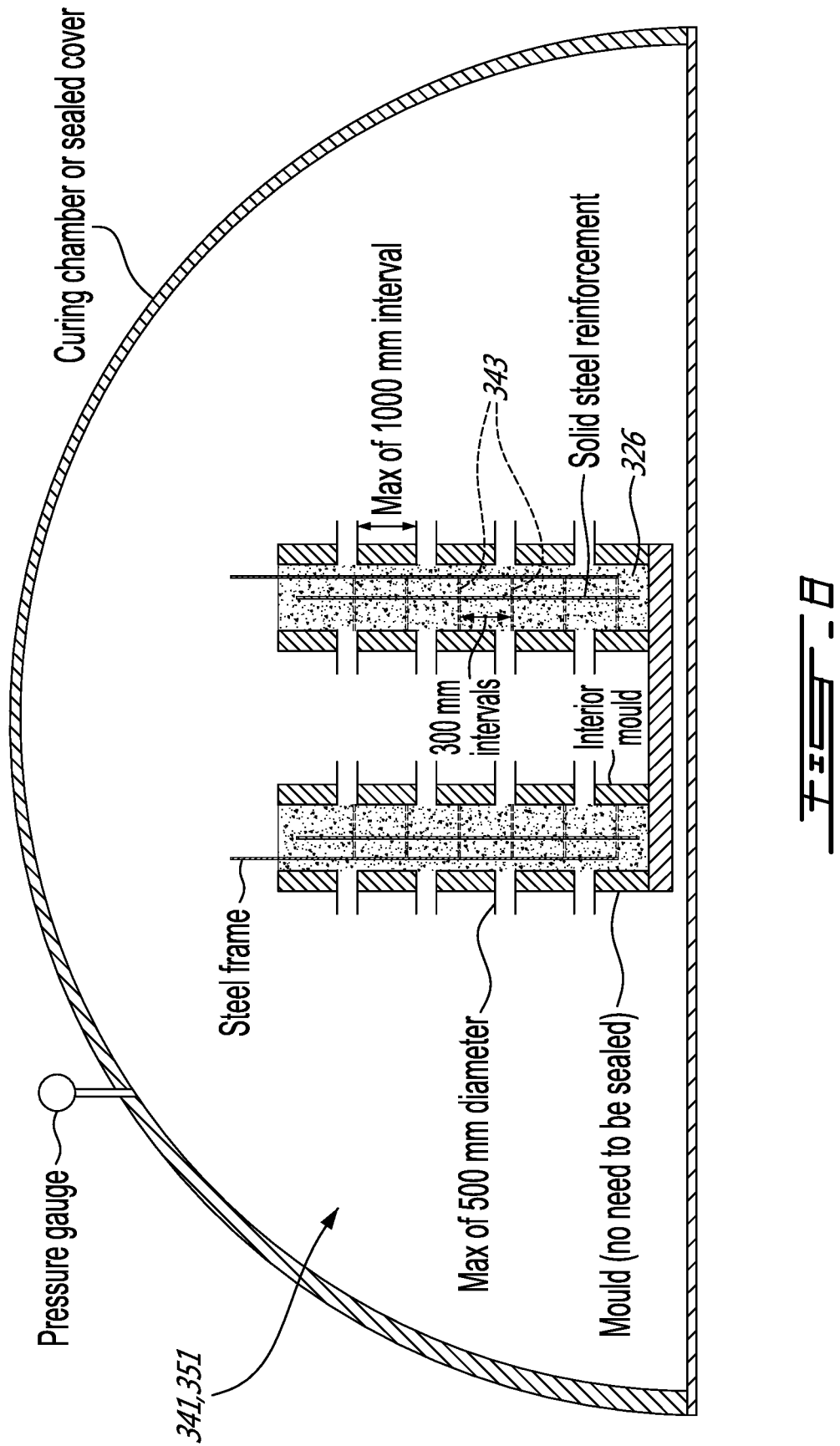

CARBONATION CURING METHOD TO PRODUCE WET-CAST SLAG-BASED CONCRETE PRODUCTS

CROSS REFERENCE TO RELATED APPLICATIONS

This application is a continuation of International Patent Application Number PCT/CA2020/050467 filed on Apr. 9, 2020, which claimed priority to U.S. Provisional Patent Application No. 62/832,966 filed on Apr. 12, 2019, the contents of both of which said applications are incorporated herein by reference in their entirety.

TECHNICAL FIELD

The present description relates to methods of producing a wet-cast slag-based concrete product particularly where the wet-cast slag-based concrete product is cast, pre-conditioned and cured with carbon dioxide inside a mould and/or inside a mould placed in a curing chamber. The wet-cast slag-based concrete product is optionally reinforced.

BACKGROUND OF THE INVENTION

Metallurgical slag is an abundant waste material that is usually landfilled. Metallurgical slag may act as a binder material under appropriate conditions. Finding new uses for metallurgical slag, including steel slag, are required.

SUMMARY

Development of concrete products, that are optionally reinforced, and made from a metallurgical slag as the main binder and carbon dioxide with the wet-cast method is explained herein.

In accordance with one aspect there is provided a method of producing a wet-cast slag-based concrete product comprising steps of: providing a composition for a non-zero-slump concrete, the composition comprising a slag based binder, an aggregate and water; mixing the slag based binder, the aggregate and the water to produce the workable non-zero-slump concrete comprising a first water to binder ratio by weight of greater than 0.2; casting/placing the non-zero-slump concrete by transferring/consolidating the non-zero-slump concrete into an air-tight mould comprising at least one gas pipe/lance; pre-conditioning the non-zero-slump concrete within the mould with at least one of i) air flow/pressurized air from the at least one gas lance, ii) heaters and iii) heating element wires embedded in concrete, to produce a conditioned slag-based intermediate comprising a second water to binder ratio by weight that is less than the first water to binder ratio by weight; sealing the air-tight mould; curing the conditioned slag-based intermediate with a gas containing carbon dioxide from the at least one gas lance to activate the conditioned slag-based intermediate and produce the wet-cast slag-based concrete product, and demoulding wet-cast slag-based concrete product.

In accordance with another aspect there is provided the method described herein, wherein the casting of the non-zero-slump concrete is free of pressing/compaction.

In accordance with yet another aspect there is provided the method described herein, wherein after curing, filling a hollow space within the at least one gas lance with cement grout, steel fiber reinforced cement mortar and cement paste.

In accordance with still yet another aspect there is provided the method described herein, the gas lance may be inserted after casting the non-zero-slump concrete.

In accordance with still yet another aspect there is provided the method described herein, wherein the slag-based binder is a slag—free of or mixed with at least one other binder selected from the group further consisting of fly ash, calcinated shale, silica fume, zeolite, GGBF (Ground Granulated Blast Furnace) slag, limestone powder, hydraulic cements and non-hydraulic cements.

In accordance with still yet another aspect there is provided the method described herein, wherein the slag is selected from the group consisting of a steel slag, a stainless steel slag, a basic oxygen converter sludge, blast furnace sludge, a by-product of zinc, iron, copper industries and combinations thereof.

In accordance with still yet another aspect there is provided the method described herein, further comprising a reinforcing step of placing a reinforcing material into the air-tight mould before the casting step.

In accordance with still yet another aspect there is provided the method described herein, wherein the reinforcing material is carbon steel, stainless steel and/or fiber reinforced polymer (FRP) reinforcement bars.

In accordance with still yet another aspect there is provided the method described herein, wherein a cumulative calcium silicate content of the slag is at least 20 weight %.

In accordance with still yet another aspect there is provided the method described herein, wherein the pre-conditioning increases porosity of at least 1% of volume of the wet-cast slag-based concrete.

In accordance with still yet another aspect there is provided the method described herein, wherein the non-zero-slump concrete has a slump value in a range of 5 mm to 250 mm.

In accordance with still yet another aspect there is provided the method described herein, wherein the non-zero-slump concrete has a compaction factor test for the fresh concrete must find a value in the range of 0.7 to 1.0.

In accordance with still yet another aspect there is provided the method described herein, wherein the steel slag is selected from the group consisting of reducing steel slag, oxidizing steel slag, converter steel slag, electrical arc furnace slag (EAF slag), basic oxygen furnace slag (BOF slag), ladle slag, fast-cooled steel slag and slow-cooled steel slag and combinations thereof.

In accordance with still yet another aspect there is provided the method described herein, wherein the wet-cast slag-based concrete is further processed to a product selected from the group consisting of precast, reinforced and non-reinforced concrete pipes, box culverts, drainage products, paving slabs, floor slabs, traffic barriers, walls manholes, retaining wall, pavers, tiles, and shingles.

In accordance with still yet another aspect there is provided the method described herein, wherein the wet-cast slag-based concrete comprises of a slag content of at least 5% by weight.

In accordance with still yet another aspect there is provided the method described herein, wherein the non-zero-slump concrete further comprises at least one accelerator, retarder, viscosity modifying agent, air entertainer, foaming agent, ASR (alkali silica reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

In accordance with still yet another aspect there is provided the method described herein, wherein the non-zero-slump concrete further comprises at least one cellulose fiber, glass fiber, micro synthetic fiber, natural fiber, polypropylene (PP) fiber, polyvinyl alcohol (PVA) fiber and steel fiber.

In accordance with still yet another aspect there is provided the method described herein, wherein the $CO_2$ curing is free of additional external sources of heat/energy.

In accordance with still yet another aspect there is provided the method described herein, wherein the demoulded conditioned slag-based intermediate is cured in a chamber/enclosed space/vessel/room with a gas containing a concentration of $CO_2$ of at least 5% by volume.

In accordance with still yet another aspect there is provided a method of producing a wet-cast slag-based concrete product comprising steps of: providing a composition for a non-zero-slump concrete, the composition comprising a slag based binder, an aggregate and water; mixing the slag based binder, the aggregate and the water to produce the workable non-zero-slump concrete comprising a first water to binder ratio by weight of greater than 0.2; casting/placing the non-zero-slump concrete by transferring/consolidating the non-zero-slump concrete into an air-tight mould, the mould comprising a mould wall and a plurality of inlets in the mould wall, wherein the plurality of inlets are optionally closed to retain the slurry non-zero-slump concrete; pre-conditioning the non-zero-slump concrete within the mould with at least one of i) an air flow/pressurized air through the plurality of inlets in the mould wall, ii) heaters and iii) heating element wires embedded in concrete, to produce a conditioned slag-based intermediate comprising a second water to binder ratio by weight that is less than the first water to binder ratio by weight; sealing the mould; curing the conditioned slag-based intermediate with a gas containing carbon dioxide via the plurality of inlets in the mould wall connected to a source of the gas to activate the conditioned slag-based intermediate and produce the wet-cast slag-based concrete product, and demoulding wet-cast slag-based concrete product.

In accordance with still yet another aspect there is provided the method described herein, wherein the casting of the non-zero-slump concrete is free of pressing/compaction.

In accordance with still yet another aspect there is provided the method described herein, wherein at least one perforated tube is optionally inserted through one of the inlets.

In accordance with still yet another aspect there is provided the method described herein, wherein the at least one perforated tube is inserted into the air-tight mould interior and traverses either fully or partially to an opposite mould wall.

In accordance with still yet another aspect there is provided the method described herein, wherein the slag-based binder is a slag—free of or mixed with at least one other binder selected from the group further consisting of fly ash, calcinated shale, silica fume, zeolite, GGBF (Ground Granulated Blast Furnace) slag, limestone powder, hydraulic cements and non-hydraulic cements.

In accordance with still yet another aspect there is provided the method described herein, wherein the slag is selected from the group consisting of a steel slag, a stainless steel slag, a basic oxygen converter sludge, blast furnace sludge, a by-product of zinc, iron, copper industries and combinations thereof.

In accordance with still yet another aspect there is provided the method described herein, further comprising a reinforcing step of placing a reinforcing material into the air-tight mould before the casting step.

In accordance with still yet another aspect there is provided the method described herein, wherein the reinforcing material is carbon steel, stainless steel and/or FRP reinforcement bars.

In accordance with still yet another aspect there is provided the method described herein, wherein a cumulative calcium silicate content of the slag is at least 20 weight %.

In accordance with still yet another aspect there is provided the method described herein, wherein the pre-conditioning increases porosity of at least 1% of volume of the wet-cast slag-based concrete.

In accordance with still yet another aspect there is provided the method described herein, wherein the non-zero-slump concrete has a slump value in a range of 5 mm to 250 mm.

In accordance with still yet another aspect there is provided the method described herein, wherein the non-zero-slump concrete has a compaction factor test for the fresh concrete must find a value in the range of 0.7 to 1.0.

In accordance with still yet another aspect there is provided the method described herein, wherein the steel slag is selected from the group consisting of reducing steel slag, oxidizing steel slag, converter steel slag, electrical arc furnace slag (EAF slag), basic oxygen furnace slag (BOF slag), ladle slag, fast-cooled steel slag and slow-cooled steel slag and combinations thereof.

In accordance with still yet another aspect there is provided the method described herein, wherein the wet-cast slag-based concrete is further processed to a product selected from the group consisting of precast, reinforced and non-reinforced concrete pipes, box culverts, drainage products, paving slabs, floor slabs, traffic barriers, walls manholes, retaining wall, pavers, tiles, and shingles.

In accordance with still yet another aspect there is provided the method described herein, wherein the wet-cast slag-based concrete comprises of a slag content of at least 5% by weight.

In accordance with still yet another aspect there is provided the method described herein, wherein the non-zero-slump concrete further comprises at least one accelerator, retarder, viscosity modifying agent, air entertainer, foaming agent, ASR (alkali silicati reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

In accordance with still yet another aspect there is provided the method described herein, wherein the non-zero-slump concrete further comprises at least one cellulose fiber, glass fiber, micro synthetic fiber, natural fiber, PP fiber, PVA fiber and steel fiber.

In accordance with still yet another aspect there is provided the method described herein, wherein the $CO_2$ curing is free of additional external sources of heat/energy.

In accordance with still yet another aspect there is provided the method described herein, wherein the demoulded conditioned slag-based intermediate is cured in a chamber/enclosed space/vessel/room with a gas containing a concentration of $CO_2$ of at least 5% by volume.

In accordance with still yet another aspect there is provided a method of producing a wet-cast slag-based concrete product comprising steps of: providing a composition for a non-zero-slump concrete, the composition comprising a slag based binder, an aggregate and water; mixing the slag based binder, the aggregate and the water to produce the workable non-zero-slump concrete comprising a first water to binder ratio by weight of greater than 0.2; casting/placing the non-zero-slump concrete by transferring/consolidating the non-zero-slump concrete into a mould, the mould comprising a mould wall defining an open top surface and a plurality of inlets in the mould wall, wherein the plurality of inlets are optionally closed to retain the workable non-zero-slump concrete; pre-conditioning the non-zero-slump concrete within the mould with at least one of i) an air flow/pressurized air through the plurality of inlets, ii) heaters and iii) heating wire elements embedded in concrete to produce a conditioned slag-based intermediate comprising a second slag to water ratio by weight that is less than the first slag to water ratio by weight; curing the conditioned slag-based intermediate with a gas containing carbon dioxide in a chamber/enclosed space/vessel/room via the plurality of inlets in the mould wall and the open top surface to activate the conditioned slag-based intermediate and produce the wet-cast slag-based concrete product, and demoulding wet-cast slag-based concrete product.

In accordance with still yet another aspect there is provided the method described herein, wherein the casting of the non-zero-slump concrete is free of pressing/compaction.

In accordance with still yet another aspect there is provided the method described herein, wherein the slag-based binder is a slag—free of or mixed with at least one other binder selected from the group further consisting of fly ash, calcinated shale, silica fume, zeolite, GGBF (Ground Granulated Blast Furnace) slag, limestone powder, hydraulic cements and non-hydraulic cements.

In accordance with still yet another aspect there is provided the method described herein, wherein the slag is selected from the group consisting of a steel slag, a stainless steel slag, a basic oxygen converter sludge, blast furnace sludge, a by-product of zinc, iron, copper industries and combinations thereof.

In accordance with still yet another aspect there is provided the method described herein, further comprising a reinforcing step of placing a reinforcing material into the mould before the casting step.

In accordance with still yet another aspect there is provided the method described herein, wherein the reinforcing material is carbon steel, stainless steel and/or FRP reinforcement bars.

In accordance with still yet another aspect there is provided the method described herein, wherein a cumulative calcium silicate content of the slag is at least 20 weight %.

In accordance with still yet another aspect there is provided the method described herein, wherein the pre-conditioning increases porosity of at least 1% of volume of the wet-cast slag-based concrete.

In accordance with still yet another aspect there is provided the method described herein, wherein the non-zero-slump concrete has a slump value in a range of 5 mm to 250 mm.

In accordance with still yet another aspect there is provided the method described herein, wherein the non-zero-slump concrete has a compaction factor test for the fresh concrete must find a value in the range of 0.7 to 1.0.

In accordance with still yet another aspect there is provided the method described herein, wherein the steel slag is selected from the group consisting of reducing steel slag, oxidizing steel slag, converter steel slag, electrical arc furnace slag (EAF slag), basic oxygen furnace slag (BOF slag), ladle slag, fast-cooled steel slag and slow-cooled steel slag and combinations thereof.

In accordance with still yet another aspect there is provided the method described herein, wherein the wet-cast slag-based concrete is further processed to a product selected from the group consisting of precast, reinforced and non-reinforced concrete pipes, box culverts, drainage products, paving slabs, floor slabs, traffic barriers, walls manholes, retaining wall, pavers, tiles, and shingles.

In accordance with still yet another aspect there is provided the method described herein, wherein the wet-cast slag-based concrete comprises of a slag content of at least 5% by weight.

In accordance with still yet another aspect there is provided the method described herein, wherein the non-zero-slump concrete further comprises at least one accelerator, retarder, viscosity modifying agent, air entertainer, foaming agent, ASR (alkali silicati reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

In accordance with still yet another aspect there is provided the method described herein, wherein the non-zero-slump concrete further comprises at least one cellulose fiber, glass fiber, micro synthetic fiber, natural fiber, PP fiber, PVA fiber and steel fiber.

In accordance with still yet another aspect there is provided the method described herein, wherein the $CO_2$ curing is free of additional external sources of heat/energy.

In accordance with still yet another aspect there is provided the method described herein, wherein the conditioned slag-based intermediate is cured in a chamber/enclosed space/vessel/room with a gas containing a concentration of $CO_2$ of at least 5% by volume.

DESCRIPTION OF THE DRAWINGS

Reference is now made to the accompanying figures, in which:

FIG. 8 is a schematic representation of a front view section of the casting, pre-conditioning and $CO_2$ curing steps in an un-sealed mould within a curing chamber or other gas enclosure according to one embodiment described herein in FIG. 7.

DETAILED DESCRIPTION

Figure 1:
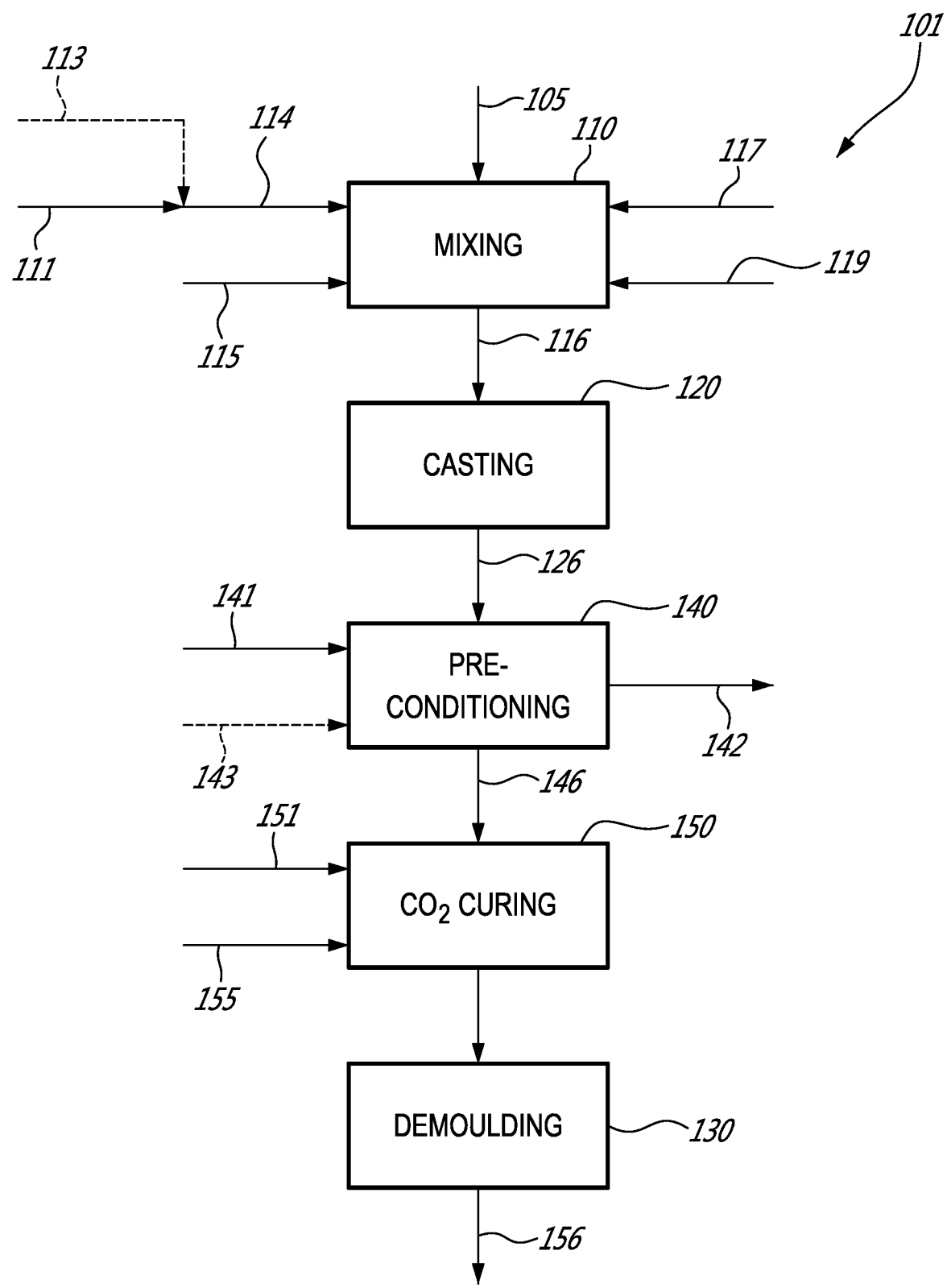
FIG. 1. is a process block diagram illustrating a method of producing a wet-cast slag-based concrete product with casting, preconditioning and $CO_2$ curing undertaken in a sealed mould with a gas pipe/lance according to one embodiment of described herein.

Traditionally, newly sintered Portland cement is used as the binder in concrete production, and wet-cast cement-based precast concrete products are commonly cured with heat and steam. The present innovation of wet-cast slag-based concrete in contrast uses by-products of metallurgical plants and in a preferred embodiment—steelmaking factories as the main binder to replace Portland cement in production of concrete and precast products. In addition, carbon dioxide is used as an activator to cure the concrete and is sequestered in the process. In preferred embodiment, no additional heat or steam are needed during the $CO_2$ curing process. The proposed wet-cast slag-based concrete products, that are optionally reinforced, may show equal or superior mechanical and durability properties when compared to the traditional cement-based precast products, while their production would reduce greenhouse gas emissions to the atmosphere. The proposed innovation would also reduce consumption of natural resources, both as conventional cement is not used in the slag-based concrete products and as a lower amounts of aggregate content are needed in the slag-based concrete products. Finally, the production of wet-cast slag-based concrete products, optionally reinforced, according to the proposed innovation may increase production rate at the precast concrete making facilities.

Materials

The main binder in the production of wet-cast slag-based concrete is a slag that in a preferred embodiment derives from steel or stainless steel production. Other by-product materials from zinc, iron, and copper production can also be considered as the slag.

Various slags can be collected from steel factories that practice different methods of steel production. Among the types of slag that can be incorporated as the main binder in production of wet-cast slag-based concrete described herein is: stainless steel slag, reducing steel slag, oxidizing steel slag, converter steel slag, electrical arc furnace slag (EAF slag), basic oxygen furnace slag (BOF slag), ladle slag, fast-cooled steel slag, slow-cooled steel slag, basic oxygen converter sludge, blast furnace sludge and combinations thereof.

The calcium oxide content by weight of slag in an preferred embodiment is more that 10%, preferably more than 15%, preferably more than 20%. The silica oxide content by weight in a preferred embodiment is more than 6%, preferably more than 8%, preferably more than 12%. The total iron oxide content of slag in a preferred embodiment is less than 40%, preferably less than 30%. Steel slag in a preferred embodiment has a cumulative calcium silicate content of at least 20% and a free lime concentration of less than 15%, and preferably less than 7% slag. The bulk density of the slag in a preferred embodiment has a range of 1.0 to 2.0 $g/cm^3$ and an apparent density may vary from 2.0 to 6.0 $g/cm^3$.

The slag may be ground to a smaller size (if required) before being incorporated into the wet-cast slag-based concrete mix described herein. Grinding the slag can be performed with any mechanical machine such as a ball mill, rod mill, autogenous mill, SAG mill, pebble mill, high pressure grinding rolls, VSI or tower mill. The grinding process can be executed either wet or dry. While a dry size reduction process is preferred, if the wet process is chosen for grinding the slag, the ground slag can be either dried completely or semi-dried after grinding. Passing the slag through a classifier(s) is an alternative option to obtain slag with a smaller particle/grain size. The classifiers used are known in the art and include but are not limited to: screens; centrifuges and cyclones.

Ground or classified slags in a preferred embodiment pass through a mesh #10 (2000 microns), preferably a mesh #50 (297 microns), preferably a mesh #200 (74 microns), preferably a mesh #400 (37 microns) each of which can be used alone or in combination with at least one other binder. Sieves may be utilized to screen slags either after or before grinding. Thus, one or combination of grinding and screening methods can be executed in order to obtain slag with a proper particle size distribution.

The slag may be pulverized and/or screened to a Blaine fineness of at least 50 $m^2/kg$ and preferably, 150 $m^2/kg$, and preferably at least 200 $m^2/kg$. In a preferred embodiment the slag in slag-based wet concrete, fifty percent of slag is smaller than 200 microns (D50=200 μm), preferably smaller than 150 microns (D50=150 μm), preferably smaller than 100 microns (D50=100 μm), preferably smaller than 50 microns (D50=50 μm), preferably smaller than 25 microns (D50=25 μm), preferably smaller than 10 microns (D50=10 μm).

The free lime content of the slag may be reduced with any standard known method in the prior art before it is incorporated into the mix. Alternatively, the slag can first be aged to reduce its free calcium oxide (free lime) content and then incorporated into the mix. Slag content of wet-cast slag-based concrete should be no less than 5% of the weight of concrete, preferably no less than 20% of the weight of the wet-cast slag-based concrete or the non-zero-slump concrete composition.

The slag-based binders may further comprise: a slag alone (i.e. a slag that is-free of another binder) or be a combination of slag with at least one other binder, such as cementitious materials/pozzolanic materials. As an example, slag can be mixed with at least one other binder producing a slag-based binder further comprising: fly ash, calcinated shale, silica fume, zeolite, GGBF (Ground Granulated Blast Furnace) slag, limestone powder, hydraulic cements, non-hydraulic cements and combinations thereof.

Various types of aggregate—including natural or artificial normal weight and lightweight aggregates—can be incorporated into the slag-based wet concrete product as filler in the production of wet-cast slag-based concrete product. Examples of potential lightweight aggregates includes natural lightweight aggregate (e.g. pumice), expanded clay aggregate, expanded shale aggregate and expanded iron slag aggregate. Other usable aggregates include: crushed stone, manufactured sand, gravel, sand, recycled aggregate, granite, limestone, quartz, chalk powder, marble powder, quartz sand and artificial aggregate. These aggregates are incorporated into the mix as fine and/or coarse aggregates. Aggregate content can be as high as 90% of the weight of the wet-cast slag-based concrete or the non-zero-slump concrete composition.

The proposed slag-based wet concrete is a workable concrete. Enough water should be added to the dry ingredient in order to produce a wet concrete (in contrast with slump-zero concrete). The required water content depends on the grain size of the slag chosen as the main binder and on the moisture content of the aggregates and content of binder. Finer ground slags absorb more water, so a higher water content would be required to produce wet concrete. Water-to binder ratio, in mass, can be 0.9, preferably 0.8, preferably 0.7, preferably 0.6, preferably 0.5, preferably 0.4, preferably 0.3, or preferably 0.2. For example, for the binder consisting of only slag with D50 of 25 microns, the water to binder ratio of 0.4 can result in a workable wet concrete. It may be the case that no additional water is required in the mix if the aggregates are very wet.

Chemical admixtures, can be introduced into the mix if required. Chemical admixtures when introduced into the mix satisfy specific properties. Possible chemical admixtures include but are not limited to: accelerators, retarders, viscosity modifying agents, air entertainers, foaming agents, ASR (alkali silica reaction) inhibitors, anti-wash-out, corrosion inhibitors, shrinkage reducers, crack reducers, plasticizers, super plasticizers, water reducers, water repellants, efflorescence controls and workability retainers.

Fibers can be added if required to the slag-based wet concrete. One or combination of cellulous fiber, glass fiber, micro synthetic fibers, micro synthetic fibers, natural fibers, PP fibers, PVA fibers and steel fibers can be incorporated into the mix.

The "zero-slump concrete" is defined as a concrete of stiff or extremely dry consistency showing no measurable slump after removal of the slump cone. A standard exemplary slump test is ASTM C143, for Hydraulic-Cement Concrete. A non-zero-slump concrete is a concrete that is not stiff nor extremely dry consistency showing a measurable slump after removal of the slump cone by a test such as ASTM C143. The slump values herein are assessed using the method described in the ASTM C143 standard.

The method of producing a wet-cast slag-based concrete can be adapted to produce a variety of products including but not limited to precast, reinforced concrete pipes, box culverts, drainage products, paving slabs, floor slabs, traffic barriers, walls, manholes, precast non-reinforced concrete (plain) pavers, retaining walls, tiles and shingles. The products shall satisfy local and national standards and codes.

Figure 4:
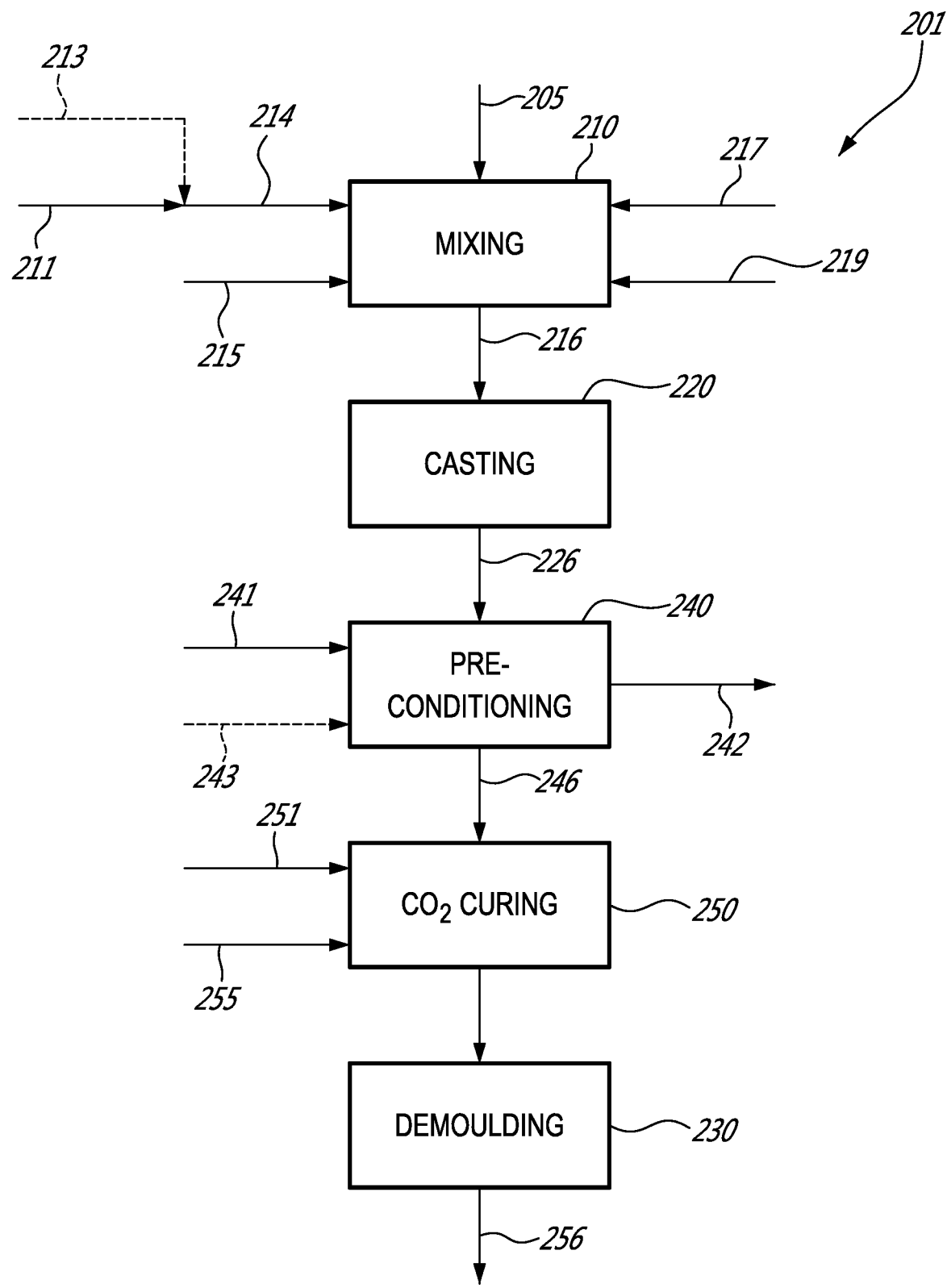
FIG. 4 is a process block diagram illustrating another method of producing a wet-cast slag-based concrete product with casting, preconditioning and $CO_2$ curing undertaken in a sealed mould with a plurality of holes in the mould for gas entry according to another embodiment of described herein.
Figure 7:
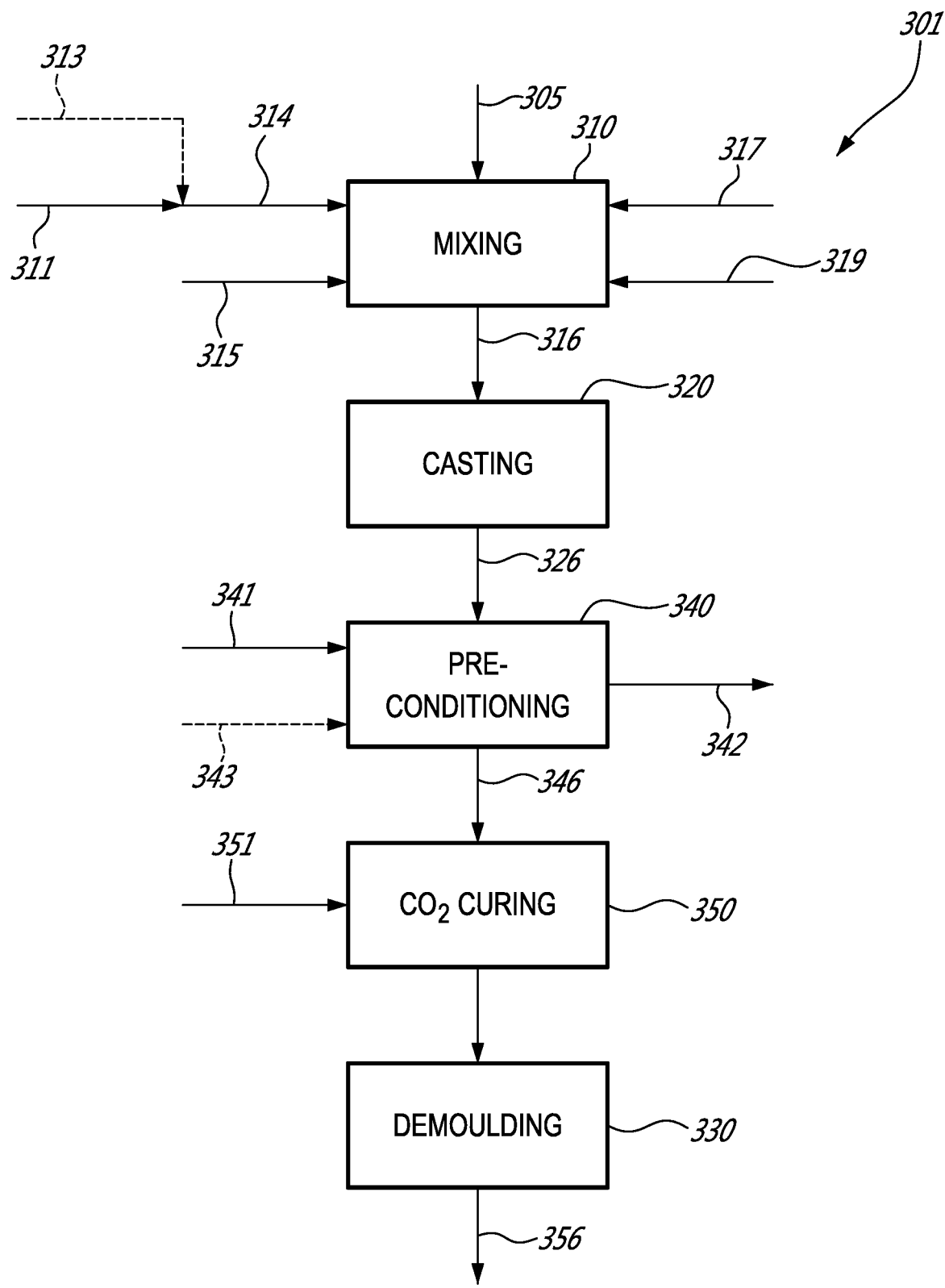
FIG. 7 is a process block diagram illustrating a further method of producing a wet-cast slag-based concrete product with casting, preconditioning and $CO_2$ curing undertaken in an open topped, un-sealed, mould with a plurality of holes in side walls of the mould, that is placed in a curing chamber or sealed enclosure according to another embodiment of described herein.

Turning to the figures, FIGS. 1, 4 and 7 presented here illustrate three embodiments of process flow diagrams of the method of producing a wet-cast slag-based concrete product. The three-digit reference numerals used in FIGS. 1, 4 and 7 include a single digit prefix 1XX, 2XX and 3XX respectively. The two digit suffix of the reference numeral represents the same feature in each of the FIGS. 1, 4 and 7. That is, reference numerals 120, 220 and 320 for example, each represent the unit operation of casting in their respective process flow diagram, specifically FIGS. 1, 4 and 7 respectively.

A) A Sealed Mould with Gas Pipes/Lances Passed Through Top Surface/Lid of the Mould Referring to FIG. 1, a method 101 of producing a wet-cast slag-based concrete product 156 is outlined with steps including casting, pre-conditioning and $CO_2$ curing in a sealed air-tight mould with at least one gas pipe/lance.

(i) Wet-Cast Slag-Based Concrete 156 Production.

The method 101 of wet-cast slag-based concrete 156 begins by providing a composition of a non-zero-slump concrete 116 and uniformly mixing 110 all ingredients of a composition that include but are not limited to: a slag 111 and an optional at least one other binder 113 that when mixed provides a slag-based binder 114 (i.e. slag alone or slag with at least one other binder), an aggregate 115, chemical admixtures 117, fibers 119 and water 105. The water-to-binder ratio of the wet-cast slag-based concrete 156 used in this innovation should be higher than the water content of dry-cast or zero-slump concrete. In a preferred embodiment the mixed non-zero-slump concrete 116 has a first water to binder ratio by weight of greater than 0.2, preferably 0.25, preferably 0.3, preferably 0.35, preferably 0.4, preferably 0.45, preferably 0.5, preferably 0.55, preferably 0.6 or preferably 0.65. The terms "water to slag-based binder ratio by weight" and "water to binder ratio by weight" are equivalents.

The non-zero-slump concrete 116 will preferably have a slump range of 5 to 250 mm. The non-zero-slump concrete 116 is preferably workable for at least 5 minutes. The mixing 110 should ensure that the non-zero-slump concrete 116 is free of signs of segregation or bleeding. The compaction factor test for the non-zero-slump concrete 116 in a preferred embodiment is in a range of 0.7 to 1.0. The temperature of non-zero-slump concrete 116 before casting is preferably 0° C. to 30° C. The fresh non-zero-slump concrete 116 in a preferred embodiment has an air void content as measured by any conventional method (an exemplary standardized test is ASTM C231 for Air Content of Freshly Mixed Concrete by the Pressure Method) should not exceed 15% of the volume of concrete. The compaction factor test is described in BS 1881-103:1993 and BS EN 12350-4:2009 (BS EN 12350-4:2009, Testing fresh concrete Part 4: Degree of compatibility). The non-zero-slump concrete 116 appropriately mixed is now ready for transfer to casting 120.

(ii) Reinforcement

In a preferred embodiment before casting the non-zero-slump concrete 116 the mould is prepared and reinforcing material such as, carbon steel, stainless steel and/or FRP reinforcement bars are placed inside the air-tight mould, if required. The diameter of the bars may vary from 5 mm to 60 mm with yield strength in the range of 100 MPa to 2100 MPa. The reinforcements to be designed in accordance with codes and standards.

(iii) Casting 120, Placement

Punched hollow pipes/lances are placed in the air-tight mould. Their geometry can be circular or rectangular, with a cross-sectional area less than 10,000 $mm^2$ per pipe, and wall thickness greater than 0.5 mm. The pipe/lance material can be carbon steel, stainless steel or alloy steel with carbon content of 0.05% to 1.4%, ensuring a yield strength for the pipe/lance between 100 MPa to 2100 MPa. Pipes/lances can be punched with mechanical tools, manual apparatuses or any tool that create holes via shearing. In an optional embodiment the pipes/lances may be made of a permeable screen/mesh material compatible for their function. The maximum size of the holes should be 10 mm, preferably 5 mm, or preferably 1 mm. Hole intervals, in both vertical and horizontal directions, should not be more than 300 mm, preferably 200 mm, preferably 100 mm, preferably 50 mm. In another example, the punched hollow pipes are made of aluminum or plastic. The pipe/lance will be used to transfer gas into the non-zero-slump concrete 116.

The freshly prepared non-zero-slump concrete 116 is transferred by appropriate means and cast in a prepared mould with any known methods in the prior arts. The mould can be made of steel, iron, aluminum, plastic, FRP or other material. The mould should be airtight and is sealed using a lid designed to cover and enclose the top of the mould in one of the possible mould materials or in airtight fabrics. This lid is attached to the body of the mould with hinges, clamps and/or bolts. A few precisely machined holes are cut in the lid to allow punched hollow pipes/lances to pass through the mould lid. In another example, the pipes/lances can be inserted into the concrete/mould right after casting concrete. The lid can be initially attached to the mould prior to the casting or in other examples it can be mounted on the mould after casting concrete.

The mould should be pre-lubricated prior to casting in order to facilitate the demoulding process 130. The wet-cast concrete or the slag-based intermediate 126 is consolidated within the mould by internal or external vibrators for no more than 120 seconds. The wet-cast concrete or the slag-based intermediate 126 does not need to be pressed or compacted inside the mould. That is, the present method in a preferred embodiment is free of being pressed or compacted. The water content of a slag-based intermediate 126 must be reduced.

(iv) Pre-Conditioning 140

Figure 2:
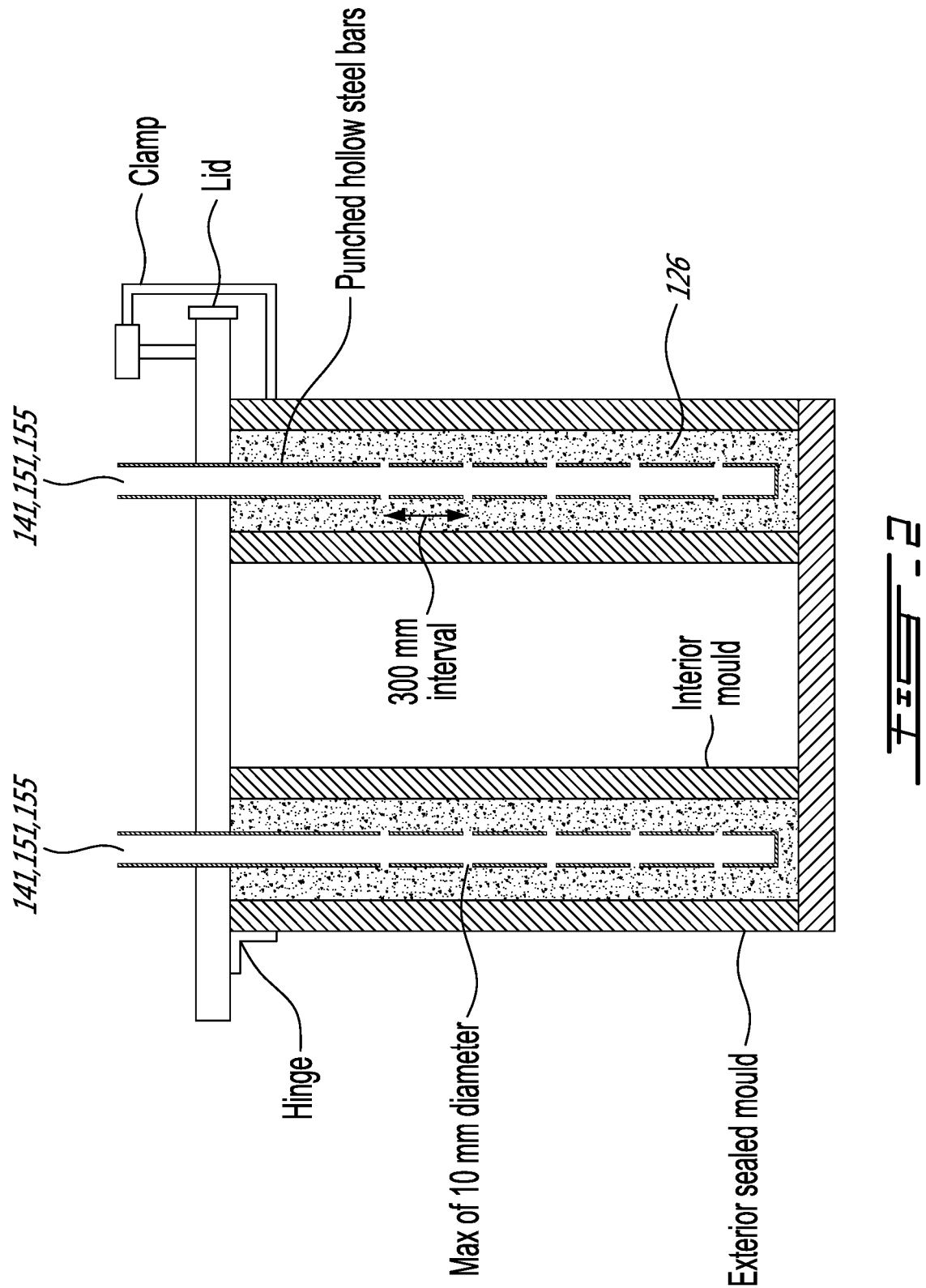
FIG. 2 is a schematic representation of a front view section of the casting, pre-conditioning and $CO_2$ curing steps in a sealed mould according to one embodiment described in FIG. 1 herein.
Figure 3:
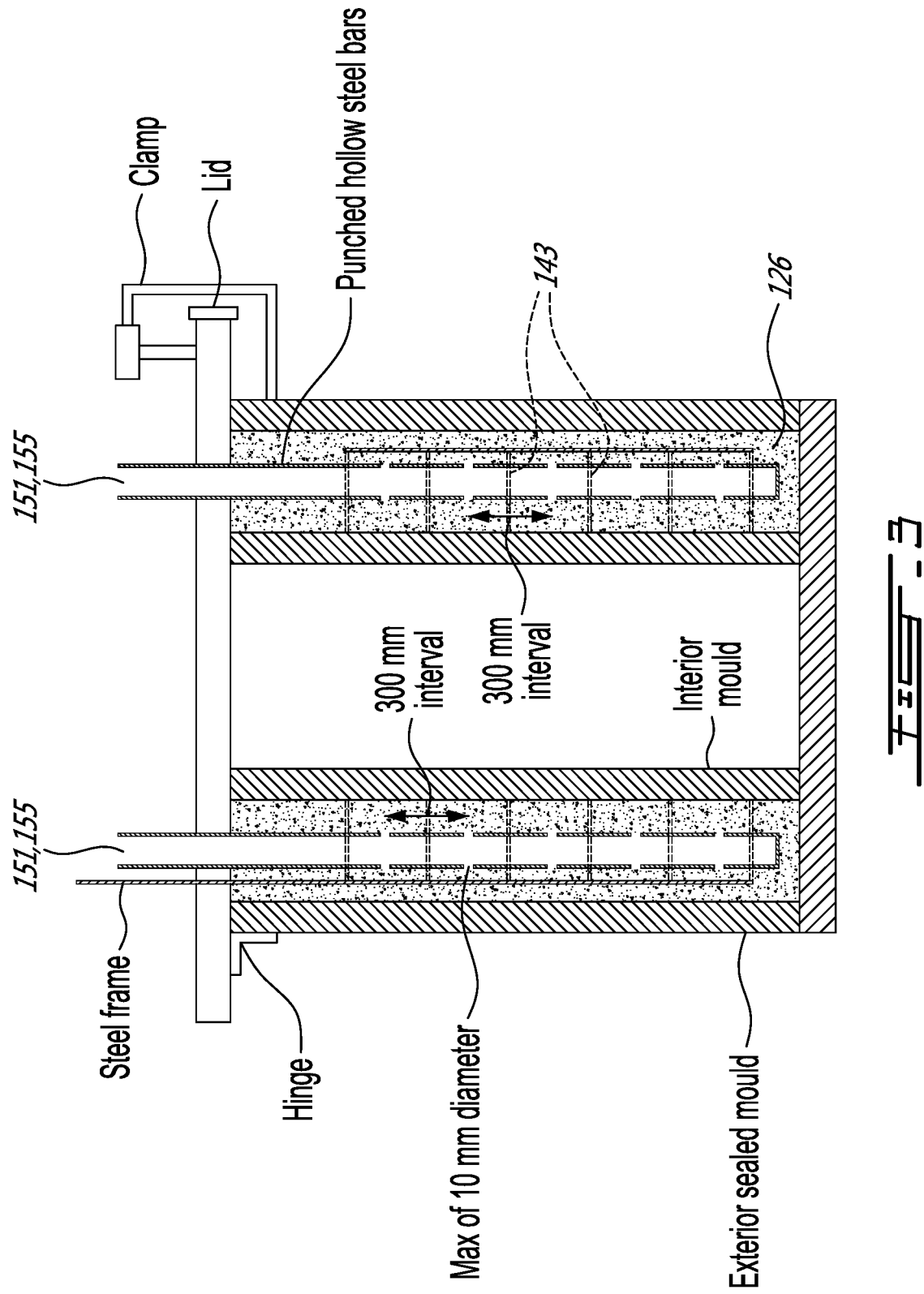
FIG. 3 is a schematic representation of a front view section of the casting, pre-conditioning and $CO_2$ curing steps in a sealed mould according to another embodiment described in FIG. 1 herein.

The process step of pre-conditioning 140 reduces the water content of non-zero-slump concrete 116 with the removal of water 142. Pre-conditioning may be conducted in at least one of two ways. In the first method, air flow 141 is introduced through the hollow pipes/lances (FIG. 2). In another example the air flow can be pressurized air. The lid is not required to be closed in the preconditioning step. This preconditioning step continues with water vapour 142 leaving the mould until initial the water-to-binder content is reduced by up to 90%, preferably 80%, preferably 70%, preferably 60%, preferably 50%, preferably 40%, preferably 30%, preferably 20% or preferably 10%. The second method uses heating element wires 143 that in a preferred embodiment are embedded in the concrete. These wires are placed in the mould before casting the concrete (FIG. 3). They may also be placed on a steel frame across the height of the mould at an interval of 300 mm. The heating wires and frame are left inside the concrete when it is cast and after concrete is cured. An electric current can then be passed through the frame and wires. Alternatively, heaters may be used, such as floor heating mats or drum heaters that can be installed so as to cover the exterior surfaces of the mould. The elements heat up the mould walls and eventually increase the evaporation process to reduce the moisture content of the concrete. The two methods may furthermore be combined to include both air 141 drying and heating 143.

The preconditioning 140 step continues until initial water-to-binder content is reduced by up to 90%, preferably 80%, preferably 70%, preferably 60%, preferably 50%, preferably 40%, preferably 30%, preferably 20% and preferably 10% or preferably 2% and the slag-based intermediate 126 is produced.

The increase of porosity defined in terms of concrete volume created by either of the above pre-conditioning methods in concrete is 70%, preferably 60%, preferably 50%, preferably 40%, preferably 30%, preferably 20%, preferably 10% or preferably 5% or preferably 1% of concrete volume. After either method, the mould is sealed, the lid closed and the mould is inspected for airtightness, with careful attention to the openings that allow the hollow gas pipes/lances to protrude.

At the end of the pre-conditioning 140 process, the remaining water in the concrete should not fall below 5% of the initial water content by mass and a conditioned slag-based intermediate 146 is formed, having a second water to binder ratio by weight that is less than the first water to binder ratio of the non-zero-slump concrete 116. The mould is sealed air-tight after completion of the pre-conditioning step 140.

(v) $CO_2$ Activation\Curing 150

The conditioned slag-based intermediate 146 is contacted with carbon dioxide, $CO_2$ or gas mixture thereof. The carbon dioxide 151 gas is introduced to cure the conditioned slag-based intermediate 146 at 5%, preferably 10%, preferably 20%, preferably 30%, preferably 40%, preferably 50%, preferably 60%, preferably 70%, preferably 80%, preferably 90%, or preferably 99.5% purity—into the conditioned slag-based intermediate 146 at ambient temperature through the punched hollow pipes/lances. The gauge pressure of the chamber/enclosed space/vessel/room will gradually increase to a range of 0.1 psi to 100 psi. Although not illustrated it is understood that some gases may escape the $CO_2$ activation\curing step.

With this embodiment of the invention, the sealed mould also operates as a curing chamber. The mould is kept pressurized with carbon dioxide for no less than 10 minutes, though the $CO_2$ curing process can continue for up to 48 hours. The inner mould temperature will increase by at least 1° C. as a result of an exothermic, accelerated curing reaction—the "$CO_2$ activation process". At the end of the activation process, the remaining $CO_2$, if any, is vented out and the lid opened. The pipes/lances can be left inside the concrete or removed from it. It is understood that a hollow space remains within the at least one gas lance, that can be filled with a cement grout, a steel fiber reinforced cement mortar, a cement paste or a polymer concrete. This filling of the gas lance occurs after $CO_2$ curing or demoulding.

(vi) Demoulding 130

Demoulding occurs soon or immediately after the $CO_2$ activation process. The excess lengths of punched hollow pipes/lances (if they are left inside the concrete) are cut off and the hollow pipes or created spaces are filled 155 with a cement grout, a steel fiber reinforced cement mortar, a cement paste, a polymer concrete or combinations thereof. The cement or polymer-based filling materials are cured for no less than 1 hour.

Upon demoulding 130 a wet-cast slag-based concrete 156 is produced.

B) A Sealed Mould with Holes on the Side Walls of the Mould.

Referring to FIG. 4, a method 201 is outlined for producing a wet-cast slag-based concrete product 256 with steps including casting, preconditioning and $CO_2$ curing in a sealed mould with a plurality of holes in the mould for gas entry.

(i) Wet-Cast Slag-Based Concrete 256 Production.

The method 201 of wet-cast slag-based concrete 256 production begins in the same way as that previously described for wet-cast slag-based concrete 156. A composition of a non-zero-slump concrete 216, is uniformly mixed 210, with the ingredients of a composition that include but once again are not limited to: a slag 211 and an optional at least one other binder 213 (providing a slag-based binder 214), an aggregate 215, chemical admixtures 217, fibers 219 and water 205. All the properties of the wet-cast slag-based concrete 256 are the same as that previously described for wet-cast slag-based concrete 256.

The mixing 210 once again ensures that the non-zero-slump concrete 216 is free of signs of segregation or bleeding.

(ii) Reinforcement

As described before in FIG. 1 with the wet-cast slag-based concrete 156, the wet-cast slag-based concrete 256, optionally includes an air-tight mould prepared with reinforcing material as previously described.

(iii) Casting 220, Placement

The mould for method 201 can once again be made of steel, iron, aluminum, plastic, or FRP. The mould is preferably air-tight and sealable using a lid designed with a top cover in a material previously described after transferring the non-zero-slump concrete 256. The lid of the air-tight mould is once again attached to the body of the mould with a combination of hinges, clamps and/or bolts. The embodiment of method 201 does not require special openings for a gas pipe/lance of the previous embodiment in the lid of the mould.

Two different types of air-tight moulds are presented for two different construction methods the two embodiment of method 201. In the embodiment of the schematic illustration of FIG. 5, the mould has a plurality of small holes in the side walls. The maximum diameter of these holes should not exceed 10 mm. The interval between adjacent holes in both vertical and horizontal directions should not be more than 300 mm. In a second embodiment of method 201 shown in FIG. 6, the air-tight mould has a plurality of fewer but larger holes in the side walls (maximum interval of the larger holes is 500 mm, 400 mm, 300 mm, preferably 200 mm, preferably 100 mm, preferably 50 mm) that include at least one perforated tubes passing through the larger mould sidewall holes. The diameter of the larger holes in the walls of the mould should fall in the range of 10 mm to 200 mm. Holes are optionally closed to retain the fresh non-zero-slump concrete. The perforated tubes placed in the mould wall are made of steel, FRP, stainless steel, plastic or aluminum. These perforate tubes optionally traverse the mould interior until reaching the other side or until they end at some distance within the mould. The cross section, interval and area of the tubes matches that of holes in the side walls. The perforated tubes are permeable to gases and define many orifices preferably having a maximum spacing between each orifice of 30 mm. The perforated tubes may be inserted into the air-tight mould interior so as to traverse either fully or partially to an opposite mould wall. The hollow space left within the perforated tubes and holes of the sidewall can be sealed by methods known to a person skilled in the art.

The perforated tubes are placed in the walls of the mould may have a wall thickness greater than 0.5 mm. The perforated tubes material can be carbon steel, stainless steel or alloy steel with carbon content of 0.05% to 1.4%, and strength of 100 MPa to 2100 MPa. Perforated tubes can be punched with mechanical tools, manual apparatuses or any tool that create holes via shearing, or of a compatible permeable screen material. The maximum size of the holes should be 10 mm, preferably 5 mm, or preferably 1 mm. In another example, the perforated tubes are made of aluminum or plastic. The perforated tubes will be used to transfer gas into the non-zero-slump concrete 216. The perforated tubes can be placed in the mould before casting concrete or inserted through the big-size holes after casting concrete.

The freshly prepared non-zero-slump concrete 216 is transferred into a prepared mould with any known methods in the prior arts. The mould once again should be air-tight and sealed using a lid designed to cover to enclose the top of the mould in one of the possible mould materials or in airtight fabrics. This lid is attached to the body of the mould with hinges, clamps and/or bolts.

The mould is once again pre-lubricated prior to casting in order to facilitate the demoulding process 230. The wet-cast concrete or the slag-based intermediate 226 is consolidated within the mould by internal or external vibrators for no more than 120 seconds. The wet-cast concrete or the slag-based intermediate 126 does not need to be pressed or compacted inside the mould. That is, the present method in a preferred embodiment is free of being pressed or compacted. The water content of a slag-based intermediate 226 is to be reduced.

(iv) Pre-Conditioning 240

Figure 5:
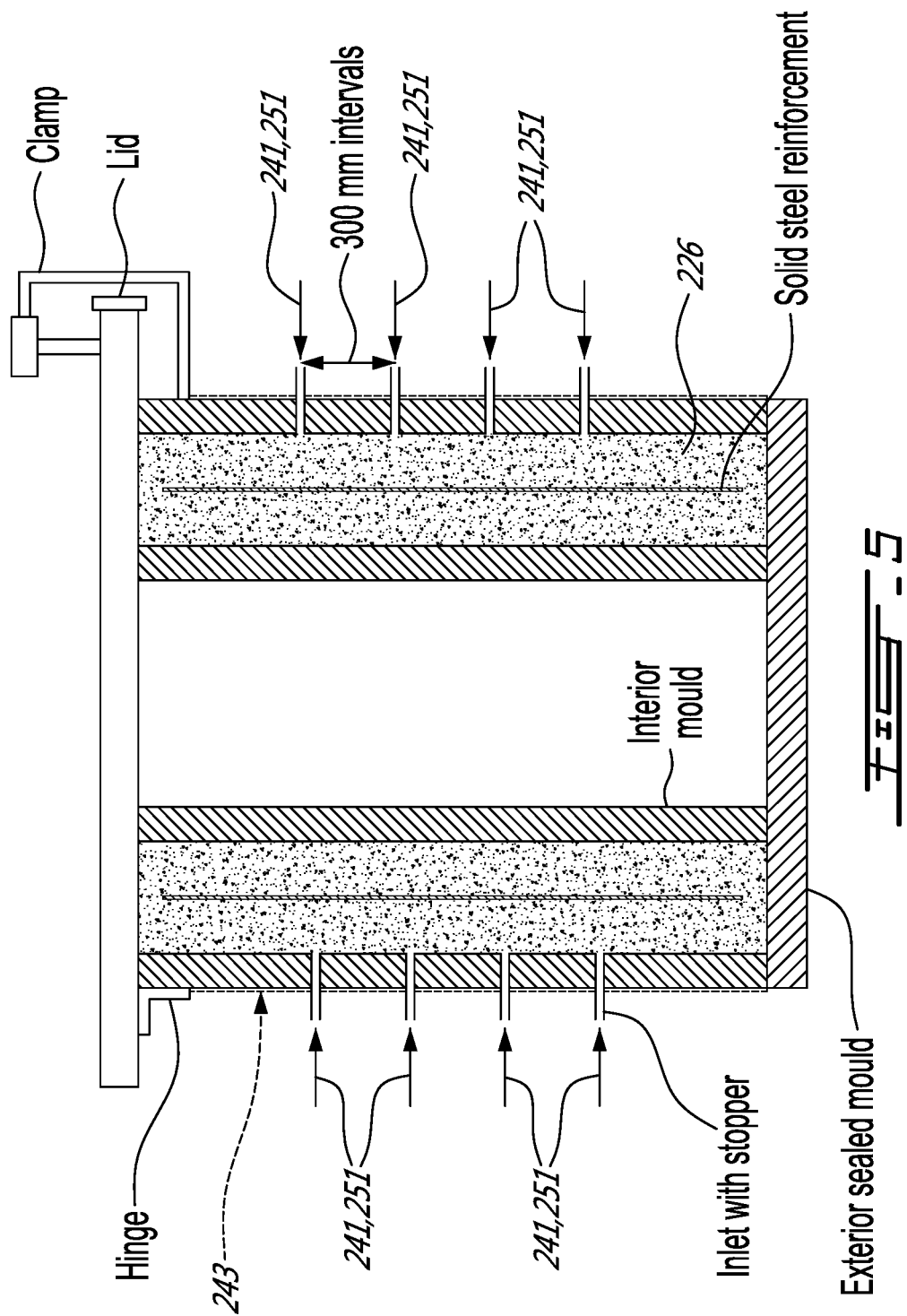
FIG. 5 is a schematic representation of a front view section of the casting, pre-conditioning and $CO_2$ curing steps in a sealed mould according to one embodiment described herein in FIG. 4.
Figure 6:
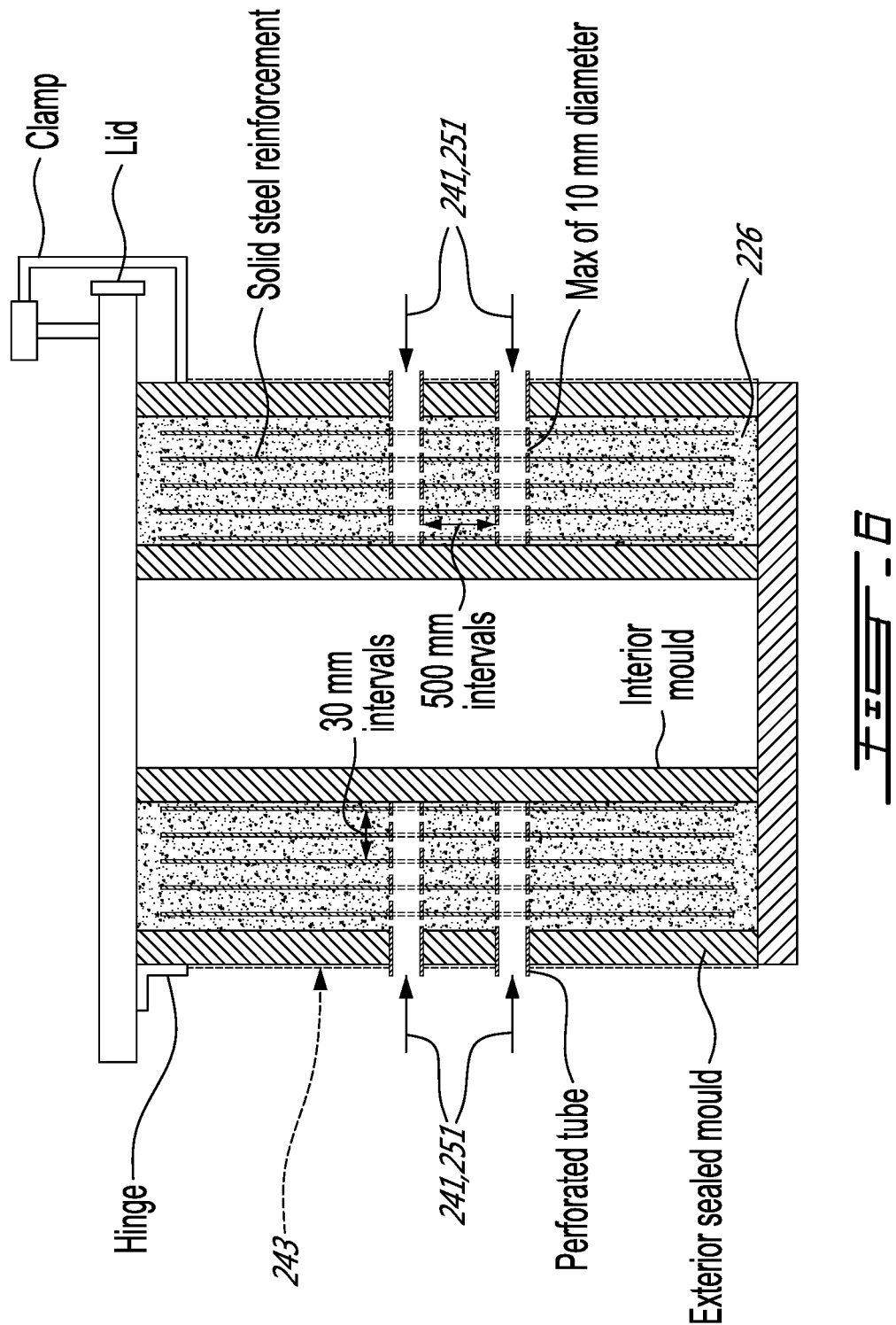
FIG. 6 is a schematic representation of a front view section of the casting, pre-conditioning and $CO_2$ curing steps in a sealed mould according to another embodiment described herein in FIG. 4.

The process step of pre-conditioning 240 once again reduces the water content to that of the slag-based intermediate 226. Pre-conditioning may be conducted in at least one of two ways. In the first method, an air flow 241 is introduced through the plurality of openings in the mould wall (FIG. 5). In another example, air flow can be pressurized air. This preconditioning step reduces the initial water-to-binder content as in method 101. In another embodiment heating element/wires 243 are used. These wires are placed on the outside of the mould before casting the wet-cast slag-based concrete 226 (FIG. 5) or may be embedded within the slag-based intermediate 226. The wires may be placed on a steel frame across the height of the mould at an interval of 300 mm. The heating elements/wires may also be floor heating mats or drum heaters installed to cover the exterior surfaces of the mould. The elements heat up the mould walls and eventually increase the evaporation process to reduce the moisture content of the slag-based intermediate 226. The two embodiments for moisture reduction may furthermore be combined to use both air 241 drying and heating 243 simultaneously.

The preconditioning 240 step continues with the escape of water vapour 242 until the initial water-to-binder content is reduced was in step 140.

The increase of porosity defined in terms of concrete volume created by either of the above pre-conditioning methods in concrete is 70%, preferably 60%, preferably 50%, preferably 40%, preferably 30%, preferably 20%, preferably 10% or preferably 5% or preferably 1% of concrete volume. After either embodiment, the mould lid is closed and the mould is inspected for airtightness, with careful attention to the openings that allow the perforated tubes at the mould wall in the case of the embodiment illustrated in FIG. 6.

At the end of the pre-conditioning 240 process, the remaining water in the concrete should not fall below 5% of the initial water content by mass and a conditioned slag-based intermediate 246 is formed, having a second water to binder ratio by weight that is less than the first water to binder ratio of the non-zero-slump concrete 216. The mould is sealed air-tight after completion of the pre-conditioning step 240.

(v) $CO_2$ Activation\Curing 250

The conditioned slag-based intermediate 246 within the mould is contacted with carbon dioxide, $CO_2$ or a gas containing $CO_2$. The holes on the sides of moulds are connected to sources of gas containing $CO_2$ via pipes. The carbon dioxide 251 gas is introduced to cure the conditioned slag-based intermediate 146 the $CO_2$ is at 5%, preferably 10%, preferably 20%, preferably 30%, preferably 40%, preferably 50%, preferably 60%, preferably 70%, preferably 80%, preferably 90%, or preferably 99.5% purity- and is injected into the conditioned slag-based intermediate 246 at ambient temperature through the side wall openings in the mould. The gauge pressure of the gas will gradually increase to a range of 0.1 psi and optionally to 100 psi. Although not illustrated it is understood that some gases may escape the mould in the $CO_2$ activation\curing step.

With this embodiment of the invention, the sealed mould also operates as a curing chamber. The mould is kept pressurized with carbon dioxide for no less than 10 minutes, though the $CO_2$ curing process can continue for up to 48 hours. The inner mould temperature will increase by at least 1° C. as a result of an exothermic, accelerated curing reaction—the "$CO_2$ activation process". At the end of the activation process, the remaining $CO_2$, if any, is vented out and the lid opened.

(vi) Demoulding 230

Demoulding occurs soon or immediately after completion of the $CO_2$ activation process. The perforated tubes can be left inside the concrete or removed from it. Any excess lengths of tubes from the mould side walls, if any, are cut off and space is filled with a cement grout 255, a steel fiber reinforced cement mortar, a cement paste, a polymer concrete or combinations thereof. The cement or polymer-based filling materials within the tubes are cured for no less than 1 hour.

Upon demoulding 230 a wet-cast slag-based concrete 256 is produced.

C) An Open Mould with Gas Supplied in Curing Chamber or Enclosure

Referring to FIG. 7, a method 301 of producing a wet-cast slag-based concrete product 356 is illustrated that includes the steps of: casting, preconditioning and $CO_2$ curing in an open mould with a plurality of holes in the mould placed in a curing chamber or other enclosure. The enclosure may be any one of at least a chamber, an enclosed space, a vessel and a room.

(i) Wet-Cast Slag-Based Concrete 356 Production.

The method 301 of producing a wet-cast slag-based concrete 356 begins as with methods 101 and 201 by providing a composition of a non-zero-slump concrete 316 and uniformly mixing 310 all ingredients of a composition that include but are not limited to: a slag 311 and an optional at least one other binder 313 (providing a slag-based binder 314), an aggregate 315, chemical admixtures 317, fibers 319 and water 305. The water-to-binder ratio of the wet-cast slag-based concrete 356 used in this innovation should be higher than the water content of dry-cast or zero-slump concrete. In a preferred embodiment the mixed non-zero-slump concrete 316 has a first water to binder ratio by weight of greater than 0.2, preferably 0.25, preferably 0.3, preferably 0.35, preferably 0.4, preferably 0.45, preferably 0.5, preferably 0.55, preferably 0.6 or preferably 0.65. The terms "water to slag-based binder ratio by weight" and "water to binder ratio by weight" are equivalents.

The non-zero-slump concrete 316 will preferably have a slump range of 5 to 250 mm. The non-zero-slump concrete 316 is preferably workable for at least 5 minutes. The mixing 310 should ensure that the non-zero-slump concrete 316 is free of signs of segregation or bleeding. The compaction factor test for the non-zero-slump concrete 316 in a preferred embodiment is in a range of 0.7 to 1.0. The temperature of non-zero-slump concrete 316 before casting is preferably 0° C. to 30° C. The fresh non-zero-slump concrete 316 in a preferred embodiment has an air void content of measured by any conventional method (an exemplary standardized test is ASTM C231 for Air Content of Freshly Mixed Concrete by the Pressure Method) should not exceed 15% of the volume of concrete. The compaction factor test is described in BS 1881-103:1993 and BS EN 12350-4:2009 (BS EN 12350-4:2009, Testing fresh concrete Part 4: Degree of compatibility). The non-zero-slump concrete 316 appropriately mixed is now ready for transfer to casting 320.

(ii) Reinforcement

In a preferred embodiment before casting the non-zero-slump concrete 316 the mould is prepared and reinforcing material such as, carbon steel, stainless steel and/or FRP reinforcement bars are placed inside the mould, if required. The diameter of the bars may vary from 5 mm to 60 mm with yield strength in the range of 100 MPa to 2100 MPa. The reinforcements to be designed in accordance with codes and standards.

(iii) Casting 320, Placement

The side walls of the mould include a plurality of openings. The mould for this embodiment of method 301, interestingly, neither airtight nor has a lid. The mould is made of steel, iron, aluminum, plastic, or FRP. The existing concrete moulds can also be adjusted by making holes in their walls. The plurality of openings preferably have a diameter of from 1 to 500 mm, or openings may have any shape with a surface area of at least 1 $mm^2$. The openings in the mould side walls allow air (and subsequently $CO_2$) to enter the mould while the mould is within a curing chamber or other enclosure. The space between each of the openings in any direction is preferably less than 1000 mm as shown in FIG. 8. Optionally the openings can be filled temporarily with stoppers to prevent fresh non-zero-slump concrete 316 from leaking out of the mould upon transfer of non-zero-slump concrete 316; rubber stoppers are a common option. If stoppers are used, they should be removed prior to allow the passage of gases for the pre-conditioning and carbonation curing steps 340 and 350 respectively.

The freshly prepared non-zero-slump concrete 316 is transferred by appropriate means and cast in a prepared mould with any known methods in the prior arts.

The mould should be pre-lubricated prior to casting in order to facilitate the demoulding process 330. The wet-cast concrete or the slag-based intermediate 326 is consolidated within the mould by internal or external vibrators for no more than 120 seconds. The wet-cast concrete or the slag-based intermediate 126 does not need to be pressed or compacted inside the mould. That is, the present method in a preferred embodiment is free of being pressed or compacted. The water content of a slag-based intermediate 326 must be reduced.

(iv) Pre-Conditioning 340

The process step of pre-conditioning 340 reduces the water content 342 of (the slag-based intermediate 326 now). Pre-conditioning may be conducted in at least one of two ways. In the first method, air flow or pressurized air 341 is introduced into inside or outside of the curing chamber or enclosure. The method in a further embodiment uses heating elements/wires 343. These wires are placed on or near the mould walls before casting 320 the concrete (FIG. 7). They are optionally placed on a steel frame across the height of the mould at an interval of 300 mm. The heating wires and frame are left inside the concrete when it is cast and after concrete is cured. An electric current can then be passed through the frame and wires. The heating elements/wires may also be floor heating mats or drum heaters installed so as to cover the exterior surfaces of the mould. The elements heat up the mould walls and eventually increase the evaporation process to reduce the moisture content of the concrete. The two methods may furthermore be combined to include both air 341 drying and heating 343.

The preconditioning 340 step continues until initial water-to-binder content is reduced by up to 90%, preferably 80%, preferably 70%, preferably 60%, preferably 50%, preferably 40%, preferably 30%, preferably 20% and preferably 10% or preferably 2%.

The increase of porosity defined in terms of concrete volume created by either of the above pre-conditioning methods in concrete is 70%, preferably 60%, preferably 50%, preferably 40%, preferably 30%, preferably 20%, preferably 10% or preferably 5% or preferably 1% of concrete volume. After either method, attention/inspection of the plurality openings ensures that air will contact the slag-based intermediate 326.

At the end of the pre-conditioning 340 process, the remaining water in the concrete should not fall below 5% of the initial water content by mass and a conditioned slag-based intermediate 346 is formed, having a second water to binder ratio by weight that is less than the first water to binder ratio of the non-zero-slump concrete 316.

(v) $CO_2$ Activation\Curing 350

The conditioned slag-based intermediate 346 is contacted with carbon dioxide, $CO_2$ or a $CO_2$ containing gas from the curing chamber or suitable gas enclosure. The carbon dioxide 351 gas is introduced to cure the conditioned slag-based intermediate 346 at 5%, preferably 10%, preferably 20%, preferably 30%, preferably 40%, preferably 50%, preferably 60%, preferably 70%, preferably 80%, preferably 90%, or preferably 99.5% purity—into the conditioned slag-based intermediate 346 at ambient temperature from the atmosphere of the curing chamber or enclosure through the plurality of openings in the side wall of the mould. The gauge pressure of the chamber/enclosed space/vessel/room will gradually increase to a range of 0.1 psi to 100 psi. Although not illustrated it is understood that some gases may escape the chamber or enclosure during the $CO_2$ activation\curing step.

With this embodiment of the invention, mould is kept pressurized with carbon dioxide for no less than 10 minutes, though the $CO_2$ curing process can continue for up to 48 hours. The inner mould temperature will increase by at least 1 C as a result of an exothermic, accelerated curing reaction—the "$CO_2$ activation process". At the end of the activation process, the remaining $CO_2$, if any, is vented out of the curing chamber or enclosure.

FIG. 8 illustrates the casting 320, pre-conditioning 340 and the $CO_2$ curing 350 steps in a front view section of an un-sealed mould according to one embodiment method 301 described herein in FIG. 7

(vi) Demoulding 330

Demoulding occurs soon or immediately after the $CO_2$ activation process.

Upon demoulding 330 a wet-cast slag-based concrete 356 is produced.

Some parameters for production of 1 cubic meter of concrete by the methods described herein:

Steel slag content=600 kg, A first water/binder ratio=0.35; Slump=5 mm, Preconditioning method=air flow Steel slag content=500 kg; Limestone powder=50 kg, A first water/binder ratio=0.55; Slump=200 mm, Preconditioning method=air flow Stainless slag content=350 kg; A first water/binder ratio=0.45; Polymer powder=50 kg, Hydraulic cement=30 kg; Fly ash=200 kg, Slump=100 mm, Preconditioning method=pressurized air Steel slag content=400 kg; Non-hydraulic cement=100 kg; A first water/binder ratio=0.4; Preconditioning method=heaters Stainless slag content=480 kg; A first water/binder ratio=0.45; silica fume=20 kg, Corrosion inhibitor=5 kg, Preconditioning method=heating element wires Steel slag content=650 kg; A first water/binder ratio=0.45; Air entraining admixture=2 litre, Slump=120 mm; Preconditioning method=heating element wires Steel slag content=700 kg; A first water/binder ratio=0.45; Steel fiber=80 kg, Viscosity modifying admixture=1 litre, Slump=50 mm; Preconditioning method=air flow Steel slag content=1200 kg, A first water/binder ratio=0.30; Superplasticizer=15 litre, Water repellent=5 litre, Slump=150 mm; Preconditioning method=pressurized air The above description is meant to be exemplary only, and one skilled in the art will recognize that changes may be made to the embodiments described without departing form the inventions disclosed. Still other modifications which fall within the scope of the present invention will be apparent to those skilled in the art, in light of a review of this disclosure and such modifications are intended to fall within the appended claims.

The invention claimed is:

1. A method of producing a wet-cast slag-based concrete product comprising steps of:
   1) providing a slag-based binder, an aggregate and water;
   2) mixing the slag based binder, the aggregate and the water to produce a workable non-zero-slump concrete composition comprising a first water to slag-based binder ratio by weight of greater than 0.2;
   3) a) casting and/or placing the non-zero-slump concrete by transferring and/or consolidating the non-zero-slump concrete composition into an air-tight mould wherein said air-tight mould is comprising at least one gas pipe and/or at least one gas lance; or
      b) casting and/or placing the non-zero-slump concrete by transferring and/or consolidating the non-zero-slump concrete composition into an air-tight mould and further comprising a step of inserting the at least one gas pipe and/or the at least one gas lance into the non-zero-slump concrete composition; or
      c) casting and/or placing the non-zero-slump concrete by transferring and/or consolidating the non-zero-slump concrete composition into an air-tight mould, the mould comprising a mould wall and a plurality of inlets in the mould wall, wherein the plurality of inlets are optionally closed to retain the non-zero-slump concrete; or
      d) casting and/or placing the non-zero-slump concrete by transferring and/or consolidating the non-zero-slump concrete composition into a mould, the mould comprising a mould wall defining an open top surface and a plurality of inlets in the mould wall, wherein the plurality of inlets are optionally closed to retain the workable non-zero-slump concrete;
   4) pre-conditioning the non-zero-slump concrete composition within the mould with at least one of i) air flow and/or pressurized air from the at least one gas lance, if one of options 3a) or 3b) is selected, ii) heaters and iii) heating element wires embedded in the non-zero-slump concrete, to produce a pre-conditioned slag-based intermediate comprising a second water to slag-based binder ratio by weight that is less than the first water to slag-based binder ratio by weight;
   5) sealing the air-tight mould when the casting corresponds to casting step 3a), 3b) or 3c);
   6) after steps 2) to 5), curing the pre-conditioned slag-based intermediate with a gas containing carbon dioxide;
      from the at least one gas pipe and/or the at least one gas lance when the casting and/or placing the non-zero-slump concrete by transferring and/or consolidating the non-zero-slump concrete composition corresponds to step 3a) or 3b); or
      via the plurality of inlets in the mould wall when the casting and/or placing the non-zero-slump concrete by transferring and/or consolidating the non-zero-slump concrete composition corresponds to step 3c); or in a chamber/enclosed space/vessel/room via the plurality of inlets in the mould wall and the open top surface when the casting and/or placing the non-zero-slump concrete by transferring and/or consolidating the non-zero-slump concrete composition corresponds to step 3d), to produce a moulded wet-cast slag-based concrete product, and 7) after the curing of the pre-conditioned slag-based intermediate, demoulding the moulded wet-cast slag-based concrete product to provide the wet-cast slag-based concrete product.

2. The method of claim 1, wherein the step of casting of the non-zero-slump concrete is free of pressing/compaction.

3. The method of claim 1, further comprising a step of filling a hollow space within the at least one gas pipe and/or lance with cement grout, steel fiber reinforced cement mortar and/or cement paste, after said step of curing.

4. The method of claim 1, wherein the gas pipe and/or lance is inserted after casting the non-zero-slump concrete composition.

5. The method of claim 1, wherein the slag-based binder is a slag—free of or mixed with at least one other binder selected from the group consisting of fly ash, calcinated shale, silica fume, zeolite, GGBF (Ground Granulated Blast Furnace) slag, limestone powder, hydraulic cements and non-hydraulic cements.

6. The method of claim 5, wherein the slag is selected from the group consisting of a steel slag, a stainless steel slag, a basic oxygen converter sludge, blast furnace sludge, a by-product of zinc, iron, copper production and combinations thereof.

7. The method of claim 1, further comprising a reinforcing step of placing a reinforcing material into the air-tight mould before the casting of step 3).

8. The method of claim 7, wherein the reinforcing material is carbon steel, stainless steel and/or FRP reinforcement bars.

9. The method of claim 1, wherein a cumulative calcium silicate content of the slag is at least 20 weight %.

10. The method of claim 1, wherein the step of pre-conditioning is conducted to provide an increased porosity of at least 1% of volume of the wet-cast slag-based concrete.

11. The method of claim 1, wherein the non-zero-slump concrete composition has a slump value in a range of 5 mm to 250 mm.

12. The method of claim 1, wherein the non-zero-slump concrete composition has a compaction factor test for fresh concrete ranging from 0.7 to 1.0.

13. The method of claim 1, wherein the slag-based binder is steel slag selected from the group consisting of reducing steel slag, oxidizing steel slag, converter steel slag, electrical arc furnace (EAF) slag, basic oxygen furnace (BOF) slag, ladle slag, fast-cooled steel slag and slow-cooled steel slag and combinations thereof.

14. The method of claim 1, wherein the wet-cast slag-based concrete product is selected from the group consisting of precast, reinforced and non-reinforced concrete pipes, box culverts, drainage products, paving slabs, floor slabs, traffic barriers, walls, manholes, retaining wall, pavers, tiles, and shingles.

15. The method of claim 1, wherein the wet-cast slag-based concrete comprises of a slag content of at least 5% by weight.

16. The method of claim 1, wherein the non-zero-slump concrete composition further comprises at least one of accelerator, retarder, viscosity modifying agent, air entertainer, foaming agent, ASR (alkali silica reaction) inhibitor, anti-wash-out, corrosion inhibitor, shrinkage reducer, concrete crack reducer, plasticizer, super plasticizer, sealer, paint, coating, water reducer, water repellant, efflorescence control, polymer powder, polymer latex and workability retainer.

17. The method of claim 1, wherein the non-zero-slump concrete composition further comprises at least one of cellulose fiber, glass fiber, micro synthetic fiber, natural fiber, PP fiber, PVA fiber and steel fiber.

18. The method of claim 1, wherein the curing of the pre-conditioned slag-based intermediate with the gas containing carbon dioxide is free of additional external sources of heat and/or energy.

19. The method of claim 1, wherein the gas containing carbon dioxide is a gas containing a concentration of $CO_2$ of at least 5% by volume.

20. The method of claim 1, wherein, in step 6c), a perforated tube is inserted through at least one of the plurality of inlets in said mould wall.

21. The method of claim 20, wherein the perforated tube is inserted into the air-tight mould interior and traverses either fully or partially to an opposite mould wall.

* * * * *